DUAL CONTROL APPARATUS IN DATA PROCESSING EQUIPMENT
Filed May 27, 1956
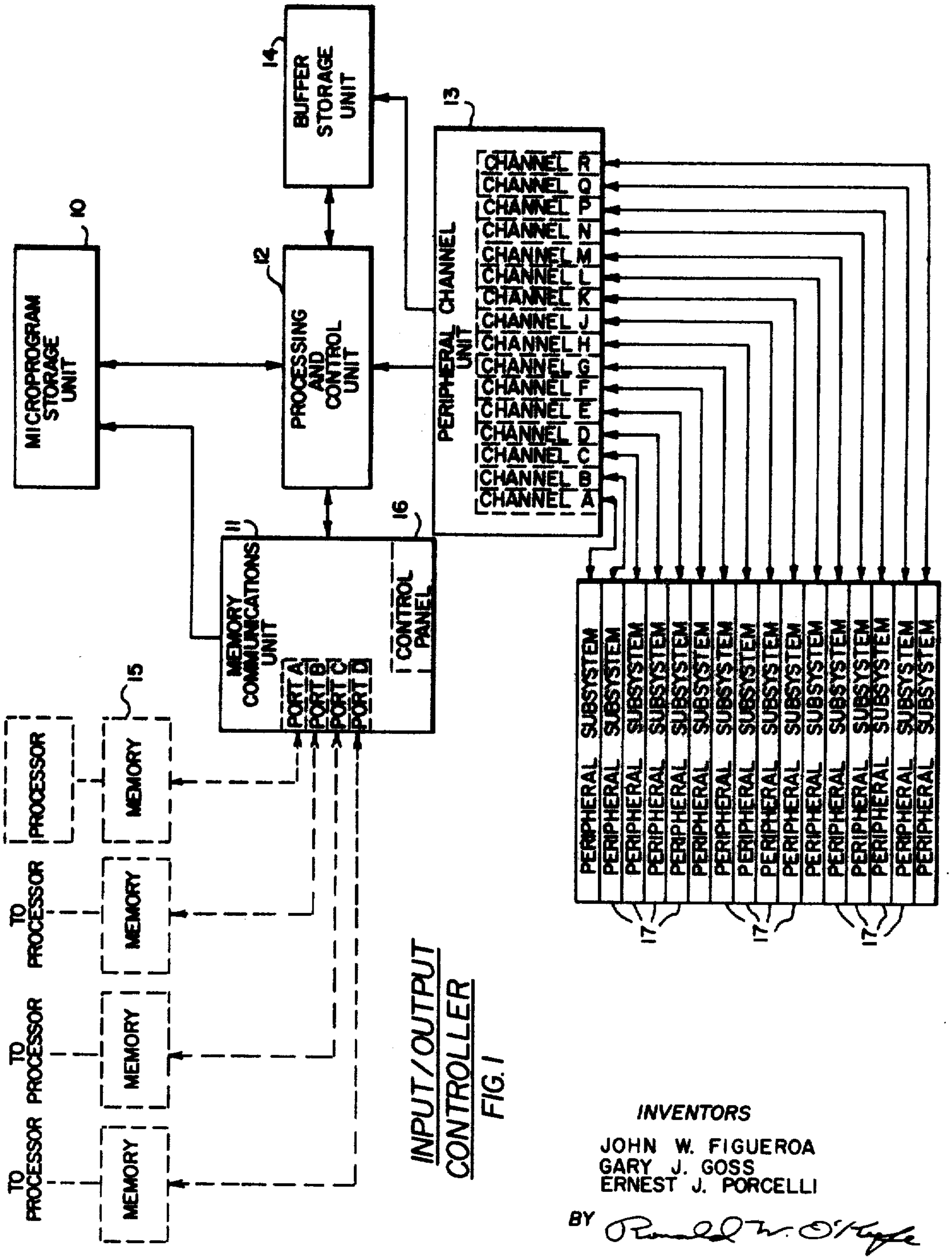
INPUT/OUTPUT CONTROLLER
FIG. I
INVENTORS
JOHN W. FIGUEROA
GARY J. GOSS
ERNEST J. PORCELLI
BY Ronald W. O'Keefe
ATTORNEY United States Patent Office 3,475,731
Patented Oct. 28, 1969

3,475,731

DUAL CONTROL APPARATUS IN DATA PROCESSING EQUIPMENT

John W. Figueroa, Gary J. Goss, and Ernest J. Porcelli, Phoenix, Ariz., assignors to General Electric Company, a corporation of New York Filed May 27, 1966, Ser. No. 553,341
Int. Cl. G06f *1/00, 7/00, 15/00*
U.S. Cl. 340—172.5 7 Claims

ABSTRACT OF THE DISCLOSURE

In order to increase the speed of operation of a special purpose data processor, duplicate sets of decode-encode apparatus are provided for generating control signals in response to supplied addresses. Signals from an address generator are switched through gates such that successive addresses are alternately stored in one and then the other of a pair of registers. The addresses thus stored are alternately applied to one set of decode-encode apparatus and then to the other set. Switching apparatus is provided to gate the control signals from the alternate sets of decode-encode apparatus to a control signal buss. The switching arrangement is such that the control signals derived from a first address controls the execution of an operation within the data processor while the control signals associated with the next succeeding address are being derived.

This invention relates to a computer system and, in particular, to apparatus for controlling operations in a computer system.

A computer system normally comprises at least one data processor, at least one data storage unit or memory, and at least one input/output controller associated with a plurality of peripheral input and output devices or systems. Each data processor in the computer system processes data by executing a program. Each data storage unit of the computer system stores data to be processed, data which is the result of processing, and programs for controlling the processing operations of a data processor. The peripheral input devices supply to a data storage unit, through the input/output controller, programs and data to be processed. The peripheral output devices receive processed data from a data storage unit through the input/output controller and utilize or store such processed data. In the described computer system, the input/output controller provides common control and a communications path for transfer of programs and data to be processed from the peripheral input devices to a data storage unit. The input/output controller also provides common control and a communications path for transfer of processed data from a data storage unit to the peripheral output devices.

A data processor of the computer system executes one or more programs. A program comprises a set of instructions, each instruction specifying a discrete type of processing operation in the computer system. A data processor interprets each instruction and generates control signals, causing operations to occur which correspond to the instruction. A data processor executes a program by sequentially responding to each of the instructions of the program to perform the corresponding operations. The processing operations specified by the instructions of a program normally require interaction of a data storage unit with the data processor executing the program and often require a similar interaction with the input/output controller. The entire computer system is thus responsive to the program being executed by a data processor of the computer system.

A component of a computer system, for example an input/output controller, normally includes a control unit and an operations unit. Processing of information is normally accomplished in the operations unit under the supervisory control and direction of the control unit. The control unit generates and transmits control signals to the operations unit to perform its function of supervising and directing the processing of information in the equipment. The functions of the control unit are, in turn, determined by commands which are received and interpreted by the control unit to generate the control signals required to supervise and direct the processing of information in the equipment.

The interpretation of instructions and the generation of control signals to direct the processing of information in computer equipment may be accomplished in the control unit by means of microprogramming. In microprogrammed computer equipment, a particular sequence of address signals is generated by the control unit in interpreting each command. Each address signal corresponds to an identifiable operational increment or step in the execution of the instruction. Each step in the sequence is termed a micro-instruction or a microstep. During each of the microsteps, one or more control signals are generated by the control unit, each control signal causing an elemental operation, called a micro-operation, to be performed in the computer equipment. A micro-operation may, for example, consist of a simple transfer of information from one register to another or from a register to an adder. Generation of control signals in the control unit in the correct sequence to cause the elemental operations or microsteps to be performed by the equipment is normally accomplished in a permanent storage device, for example a diode or magnetic core matrix, provided in the control unit. The technique of microprogramming permits simplification of the logical structure of the control unit, facilitating maintenance of the control unit and increasing the reliability of the digital computer equipment.

Control apparatus in a computer system generates the necessary control signals to cause a particular operation or operations to be performed and, upon completion of performance of the operation or operations, the control signals corresponding to the next operation are generated. During the time that the control signals for the next operation are being generated, the equipment is non-productive with respect to useful processing of information. The time lag between completion of one operation and generation of the control signals for the next operation decreases the overall efficiency of operation of the equipment. Accordingly, it is desirable to improve the efficiency of computer equipment by eliminating or minimizing non-productive time.

It is therefore an object of this invention to provide improved control apparatus in computer equipment.

It is another object of this invention to provide control apparatus in computer equipment which increases the efficiency of such equipment.

It is a further object of this invention to provide control apparatus in computer equipment which increases the processing capabilities of the equipment.

The foregoing objects are achieved, in accordance with the illustrated embodiment of the invention, by providing duplicate sets of decode-encode apparatus for generating control signals. A counter is provided for furnishing a sequence of control items or addresses. A register for storing a control item or address is associated with each set of decode-encode apparatus. First and second sets of gates are provided, the first set of gates transferring addresses provided by the counter to one or the other of the registers while the second set of gate transfers to a control signal bus the control signals generated by one or the other of the sets of decode-encode apparatus. An address or control item is applied by the first set of gates to the first register, the output of the first register being employed by the first set of decode-encode apparatus to develop control signals corresponding to that control item. Upon completion of an operation in the equipment, these control signals are transmitted through the second set of gates to the control signal bus to cause a corresponding operation to be performed in the equipment. During the time period in which this operation is being performed, the next address or control item is transferred through the first set of gates to the second register. The output of the second register is employed by the second set of decode-encode apparatus to develop the control signals for the next operation, these control signals being applied to the second set of gates. Upon completion of the current operation in the equipment, the second set of gates transfers the control signals developed in the second set of decode-encode apparatus to the control signal bus. Simultaneously, the next address or control item is transferred by the first set of gates to the first register, the control signals corresponding to this control item being developed in the first set of decode-encode apparatus during performance in the equipment of the operation corresponding to the control signals on the control signal bus. As each operation is completed a new address is transferred to one register simultaneous with the transfer to the control signal bus of the control signals generated in response to the address in the other register. Thus, the control signals required to control the next operation in the computer equipment are developed during performance of the current operation and are available to initiate and control the next operation immediately upon completion of the current operation.

For a complete description of the input/output controller of FIGURE 1 and of the instant invention which is embodied in such input/output controller, reference is made to United States Patent No. 3,409,880, issued to Gerald Galler, Ernest J. Porcelli, and Laszlo L. Rakoczi, and assigned to the assignee of the present invention. More particularly, FIGURES 2–188 of the drawing; column 5, lines 69–75; columns 6–103; and column 104, lines 1–48 of United States Patent 3,409,880 are incorporated herein by reference and made a part of the instant patent application.

Description of drawings

The subject matter of the invention is particularly pointed out and distinctly claimed in the concluding portion of the specification. The invention, however, both as to organization and method of operation, may best be understood by reference to the following description taken in connection with the accompanying drawings, in which:

FIGURE 1 is a block diagram of the input/output controller of a data processing system to which the instant invention is applicable.

What is claimed is:

1. In processing apparatus for performing a series of operations in response to a corresponding series of control items, the combination comprising: source means for providing a plurality of control items in sequence, first generating means responsive to a control item for providing corresponding control signals, second generating means responsive to a control item for providing corresponding control signals, transfer means for applying alternate control items in the sequence to said first generating means and for applying the remaining control items in the sequence to said second generating means, utilization means responsive to the control signals generated by said first and second generating means to perform corresponding operations, and transfer means for alternately transferring the control signals generated by said first generating means and the control signals generated by said second generating means to said utilization means.

2. In processing apparatus for performing a series of operations in response to a corresponding series of control items, the combination comprising: source means for providing a plurality of control items in sequence, first generating means responsive to a control item applied thereto for providing at least one control signal corresponding to the control item, second generating means responsive to a control item applied thereto for providing at least one control signal corresponding to the control item, first gating means for receiving the sequence of control items provided by said source means and for transferring the control items of the sequence alternately to said first generating means and to said second generating means, utilization means responsive to the control signals generated by said first and said second generating means for performing corresponding operations, and second gating means for receiving the control signals generated by said first and second generating means and for transferring the control signals generated by said first generating means and by said second generating means alternately to said utilization means.

3. In processing apparatus for performing a series of operations in response to a corresponding series of control items, the combination comprising: source means for providing a plurality of control items in sequence, first generating means responsive to a control item applied thereto for providing at least one control signal corresponding to the control item, second generating means responsive to a control item applied thereto for providing at least one control signal corresponding to the control item, first gating means for receiving the sequence of control items provided by said source means, utilization means responsive to the control signals generated by said first and said second generating means for performing corresponding operations, second gating means for receiving the control signals generated by said first and said second generating means, and control means connected to said first and said second gating means for causing said first gating means to transfer a control item from said source means to one of said first and second generating means while causing said second gating means to transfer the control signals generated by the other of said first and second generating means to said utilization means.

4. In processing apparatus for performing a series of operations in response to a corresponding series of control items, the combination comprising: source means for providing a plurality of control items in sequence, first generating means responsive to a control item applied thereto for providing at least one control signal corresponding to the control item, second generating means responsive to a control item applied thereto for providing at least one control signal corresponding to the control item, first gating means for receiving the sequence of control items provided by said source means, utilization means responsive to the control signals generated by said first and second generating means for performing corresponding operations, second gating means for receiving the control signals generated by said first and second generating means, control means connected to said first and said second gating means and responsive to a control signal for causing said first gating means to transfer successive control items in the sequence from said source means to alternate ones of said first and second generating means while simultaneously causing said second gating means to transfer the control signals generated by the other of said first and second generating means to said utilization means, and means responsive to the completion of an operation by said utilization means by providing a control signal to said control means.

5. In processing apparatus for performing a series of operations in response to a corresponding series of control items, the combination comprising: source means for providing a plurality of control items in sequence, first storage means for storing a control item, second storage means for storing a control item, first generating means connected to said first storage means and responsive to a control item in said first storage means for providing at least one control signal corersponding to the control item in said first storage means, second generating means connected to said second storage means and responsive to a control item in said second storage means for providing at least one control signal corresponding to the control item in said second storage means, first gating means for receiving the sequence of control items provided by said source means, said first gating means being connected to said first and said second storage means, utilization means responsive to the control signals generated by said first and second generating means for performing corresponding operations, second gating means for receiving the control signals generated by said first and second generating means, said second gating means being connected to said utilization means, and control means for causing said first gating means to transfer successive control items provided by said source means alternately to said first and to said second storage means and for causing said second gating means to transfer control signals alternately from said second and from said first generating means to said utilization means in synchronism with the transfers effected by said first gating means.

6. In processing apparatus for performing a series of operations in response to a corresponding series of control items, the combination comprising: source means for providing a plurality of control items in sequence, first generating means responsive to a control item applied thereto for providing at least one control signal corresponding to the control item, second generating means responsive to a control item applied thereto for providing at least one control signal corresponding to the control item, utilization means responsive to the control signals generated by said first and said second generating means for performing corresponding operations, and transfer means for transferring successive control items from said source means alternately to said first and said second generating means, said transfer means including means for transferring the control signals from one of said first and second generating means to said utilization means when said transfer means transfers a control item to the other of said first and second generating means.

7. In microprogrammed apparatus for performing a series of microstep operations in response to a corresponding series of microstep address, the combination comprising: address means for generating a predetermined series of microstep addresses, a first register for storing a microstep address, a second register for storing a microstep address, first matrix means responsive to a microstep address in said first register for providing at least one control signal corresponding to the microstep address in said first register, second matrix means responsive to a microstep address in said second register for providing at least one control signal corresponding to the microstep address in said second register, utilization means responsive to the control signals generated by said first and second matrix means for performing corresponding microstep operations, first gating means for receiving the microstep addresses provided by said address means and connected to said first and second register means, second gating means for receiving the control signals generated by said first and second matrix means and connected to said utilization means, control means for generating switching signals for causing said first gating means to transfer successive microstep addresses provided by said address means alternately to said first register and to said second register and for causing said second gating means to transfer control signals alternately from said first matrix means and from said second matrix means to said utilization means, said switching means including means for causing said first gating means to transfer a microstep address to one of said first and second registers simultaneous with the transfer to said utilization means by said second gating means of control signals from the decode matrix connected to the other of said first and second registers.

References Cited

UNITED STATES PATENTS

| | | | |
|---|---|---|---|
| 3,020,525 | 2/1962 | Garrison et al. | 340—172.5 |
| 3,254,329 | 5/1966 | Lukoff et al. | 340—172.5 |

PAUL J. HENON, Primary Examiner

R. B. ZACHE, Assistant Examiner